United States Patent
Tsurumi et al.

(10) Patent No.: US 8,102,945 B2
(45) Date of Patent: Jan. 24, 2012

(54) SIGNAL PROCESSING DEVICE AND SIGNAL PROCESSING METHOD

(75) Inventors: Tsutomu Tsurumi, Kawasaki (JP); Miwa Taniguchi, Kawasaki (JP); Eiji Iida, Kawasaki (JP); Taro Asao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 705 days.

(21) Appl. No.: 11/776,036

(22) Filed: Jul. 11, 2007

(65) Prior Publication Data

US 2008/0031393 A1 Feb. 7, 2008

(30) Foreign Application Priority Data

Aug. 2, 2006 (JP) ................. 2006-210512

(51) Int. Cl.
*H03K 9/00* (2006.01)
*G06F 11/00* (2006.01)
*H03M 13/00* (2006.01)

(52) U.S. Cl. .......... 375/316; 714/801; 714/755
(58) Field of Classification Search .......... 375/316; 741/755; 370/464

See application file for complete search history.

(56) References Cited

U.S. PATENT DOCUMENTS

| | | | | |
|---|---|---|---|---|
| 5,337,886 A | * | 8/1994 | Anderson et al. | 198/728 |
| 5,506,839 A | * | 4/1996 | Hatta | 370/236 |
| 5,729,515 A | * | 3/1998 | Inagawa et al. | 369/47.33 |
| 5,896,391 A | * | 4/1999 | Solheim et al. | 714/704 |
| 6,025,946 A | * | 2/2000 | Miyamori et al. | 398/185 |
| 6,337,886 B1 | * | 1/2002 | Asahi | 375/316 |
| 6,801,720 B1 | * | 10/2004 | Mizuochi et al. | 398/30 |
| 7,764,708 B2 | | 7/2010 | Okamori | |
| 2002/0034191 A1 | * | 3/2002 | Shattil | 370/464 |
| 2003/0053486 A1 | | 3/2003 | Okamori | |
| 2003/0126238 A1 | * | 7/2003 | Kohno et al. | 709/220 |
| 2006/0195763 A1 | | 8/2006 | Kikuchi et al. | |

FOREIGN PATENT DOCUMENTS

| | | |
|---|---|---|
| EP | 1049272 | 11/2000 |
| JP | 10126389 | 5/1998 |
| JP | 10-313277 | 11/1998 |
| JP | 2000312189 | 11/2000 |
| JP | 200360729 | 2/2003 |

OTHER PUBLICATIONS

Notice of Reason for Rejection dated Sep. 6, 2011 from the corresponding Japanese Application No. 2006-210512, with English translation.

* cited by examiner

*Primary Examiner* — David C. Payne
*Assistant Examiner* — Sarah Hassan
(74) *Attorney, Agent, or Firm* — Katten Muchin Rosenman LLP

(57) ABSTRACT

The present invention relates to a signal processing device and a signal processing method that are capable of processing various types of signals. The signal processing device comprises a frequency detecting unit detecting a frequency of a data signal by checking synchronization between the data signal and a reference signal, an oscillation unit supplying the reference signal to the frequency detecting unit, a frame detecting unit detecting a frame organizing the data signal, and a control unit changing a frequency of the reference signal supplied by the oscillation unit to take frequency synchronization between the data signal and the reference signal in checking the synchronization by the frequency detecting unit, and setting information of the frequency, of which the frequency synchronization has been taken, in the frame detecting unit.

4 Claims, 5 Drawing Sheets

SIGNAL PROCESSING DEVICE AND SIGNAL PROCESSING METHOD

BACKGROUND OF THE INVENTION

1. Field of the Invention

The present invention relates to a signal processing device to which signals having a variety of transmission rates and frame formats are inputted, and to a signal processing method.

2. Description of the Related Art

At the present, there is diversification of fast digital communication technologies such as SONET/SDH (Synchronous Optical NETwork/Synchronous Digital Hierarchy), GbE (Gigabit Ethernet (registered trademark)), FC (Fiber Channel), FICON (FIber CONnection), SCON (System CONnection), etc. These communication technologies are utilized corresponding to communication services etc to be provided.

An OTN (Optical Transport Network) exists as a technology of transferring these diversified client signals across an optical core network. The OTN is defined as a next generation optical transmission network of which standardization is underway in the ITU-T (International Telecommunication Union Telecommunication Standardization Sector). The OTN has characteristics such as enabling a dynamic change of an optical path of a WDM transmission system, transmission of the variety of client signals as described above and high-reliability transmission by adopting a forward error correction (which will hereinafter be abbreviated to FEC) code and over head (which will hereinafter be abbreviated to OH).

A relay device in the WDM transmission system utilizing this type of OTN needs to monitor and set a type, a transmission rate, etc of a signal to be relayed. It is because the various types of client signals can not be flowed across (the relay device), unless thus done. In the conventional relay device, frequency information, a type of a frame format, etc of the processing target client signal have hitherto been set in a frequency detecting unit and a frame detecting unit within the relay device from a monitoring device etc connected to the relay device.

It is to be noted that an optical regeneration repeater of a bit rate automatic selection type is disclosed by way of a document of the prior art related to the invention of the present application in the following document. The conventional art document is "Japanese Patent Application Laid-Open Publication No. 10-313277."

In the conventional relay device, however, a system administrator must manually set the frequency information and the type of the frame format while monitoring an alarm signal etc sent to a monitoring device etc. Hence, initial setting from the monitoring device etc is required each time the transmission rate and the frame format change due to switchover of a line etc, and a tremendous labor and much time are needed for flowing the signals through in such a case. Still more, at the present time when the signals increase in their types due to the diversification of the communication technologies, the initial setting involves expending greater amounts of labor and time.

As the types of the client signals, there are bit rates such as STS-3/12/48/192/768(SONET), STM-1/4/16/64/256(SDH), OPU1/2(OTN), 1GbE/10GLAN/10GWAN(GbE) and 1G/2G/4G(FC) for respective frame formats based on SONET/SDH, GbE, OPU (Optical Channel Payload Unit), 10GbE, FC, FICON and SCON according to the communication standards. Further, at the present, the long-distance WDM transmission and the metropolitan WDM transmission employ the following types of signals. These signals are exemplified such as OC192 signal+G.7090TU2 (10.7 Gbps), OC192 signal+U-FECOTU2 (10.7 Gbps), OC48×4/ODU1×4/ODU2+G.7090TU2 (10.7 Gbps), OC48×4/ODU1×4/ODU2+U-FEC OTU2 (10.7 Gbps), 10GLAN signal+G.7090TU2 (11.9 Gbps), 10GLAN signal+U-FEC OTU2 (11.9 Gbps), 10GWAN signal+G.7090TU2 (10.7 Gbps) and 10GWAN signal+U-FEC OTU2 (10.7 Gbps).

Moreover, in the optical regeneration repeater disclosed in the Patent document 1, a clock frequency is detected from an inputted data signal, and hence, in a case where the high-speed data signal is inputted, a device operating with a faster clock than the clock frequency is required. Further, if data with an unknown frame format is inputted, it is impossible to set the data signal in a status of flowing through the optical regeneration repeater.

SUMMARY OF THE INVENTION

It is an object of the present invention to provide a signal processing device and a signal processing method that are capable of processing various types of signals.

An embodiment of the present invention adopts the following configurations in order to solve the problems. Namely, a signal processing device in one embodiment of the present invention comprises a frequency detecting unit detecting a frequency of a data signal by checking synchronization between the data signal and a reference signal, an oscillation unit supplying the reference signal to the frequency detecting unit, a frame detecting unit detecting a frame organizing the data signal, and a control unit changing a frequency of the reference signal supplied by the oscillation unit to take frequency synchronization between the data signal and the reference signal in checking the synchronization by the frequency detecting unit, and setting information of the frequency, of which the frequency synchronization has been taken, in the frame detecting unit.

In the signal processing device according to one embodiment of the present invention, the control unit changes the frequency of the reference signal outputted from the oscillation unit, and the frequency synchronization between the predetermined data signal and the reference signal is taken. Then, the frequency information with the frequency synchronization taken is set in another frame detecting unit. With this scheme, for example, the frame detecting unit operates in synchronization with the thus-set frequency information and can detect the frame.

Namely, in the signal processing device according to the present invention, when the transmission rate of the data signal to be inputted is changed, e.g., even when the frequency of the data signal is changed, the frequency clock synchronizing with this data signal is automatically detected. Moreover, the frame detecting unit comes to operates in synchronization by use of the frequency information of the frequency clock that is thus automatically detected.

Accordingly, though hitherto capable of processing only the signals having the known transmission rates when inputted, according to the present invention, it is possible to execute the predetermined signal processing of the signals having unknown transmission rates when inputted in a way that automatically performs the self-setting. This scheme makes it possible to reduce the labor and the time for the initial setting to a large degree in the case of the signal switchover etc.

Moreover, the frame detecting unit may include an error correction processing unit each performing error correction of the frame organizing the data signal, corresponding to types of error correction codes, and the control unit may control the frame detecting unit so as to implement the error correction processing unit corresponding to the type of the error correction code attached to the frame organizing the data signal.

In the case of adopting such a configuration, the control unit controls the frame detecting unit in which to set the frequency information of which the synchronization with the data signal has been taken, and the error correction unit coincident with the type of the error correction code attached to the frame organizing the data signal is implemented.

Namely, in the signal processing device according to the present invention, even when the type of the error correction code used in the frame of the data signal to be inputted is unknown, the error correction corresponding to the type of the used error correction code is executed.

Furthermore, the frame detecting unit may include a format detecting unit each detecting a frame format of a client signal that is set in a payload field of the frame organizing the data signal, corresponding to the respective frame format types, and the control unit may control the frame detecting unit so as to implement the format detecting unit corresponding to the frame format type of the client signal, which is set in the payload field of the frame organizing the data signal.

In the case of adopting such a configuration, the control unit controls the frame detecting unit in which to set the frequency information of which the synchronization with the data signal has been taken, and the format detecting unit coincident with the type of the frame format of the client signal that is set in the payload field of the frame of the data signal, is implemented.

Namely, in the signal processing device according to the present invention, if there exists the client signal that is data-wrapped with the data signal to be inputted and even if the frame format of the client signal is unknown, the frame format of the client signal can be properly detected.

Accordingly, though hitherto capable of processing only the signals having the known frame formats when inputted, according to the present invention, it is possible to execute the signal processing of the signals having unknown frame formats when inputted in a way that automatically performs the self-setting. This scheme makes it possible to reduce the labor and the time for the initial setting to a large degree in the case of the signal switchover etc.

Moreover, the present invention may also be a relay device including the signal processing functions described above. The relay device is capable of properly relaying the signals having the unknown transmission rates and the unknown frame formats. On the occasion of relaying these signals, the initial setting etc is not required even in a case where the type of the signal to be inputted is switched over.

It should be noted that the present invention may also be a signal processing method executed by any one of the functions given above, and may further be a program for making the signal processing device actualize any one of the functions given above. Moreover, the present invention may also be a readable-by-computer storage medium recorded with such a program.

According to the present invention, it is feasible to actualize the signal processing device and the signal processing method that are capable of processing the various types of signals.

DESCRIPTION OF THE PREFERRED EMBODIMENTS

Embodiment

A wavelength division multiplexing transmission relay device (which will hereinafter be abbreviated to a WDM relay device) in an embodiment of the present invention will hereinafter be described with reference to the drawings. It should be noted that a configuration in the following embodiment is an exemplification, and the present invention is not limited to the configuration in the embodiment.

[Configuration of Device]

Figure 1:
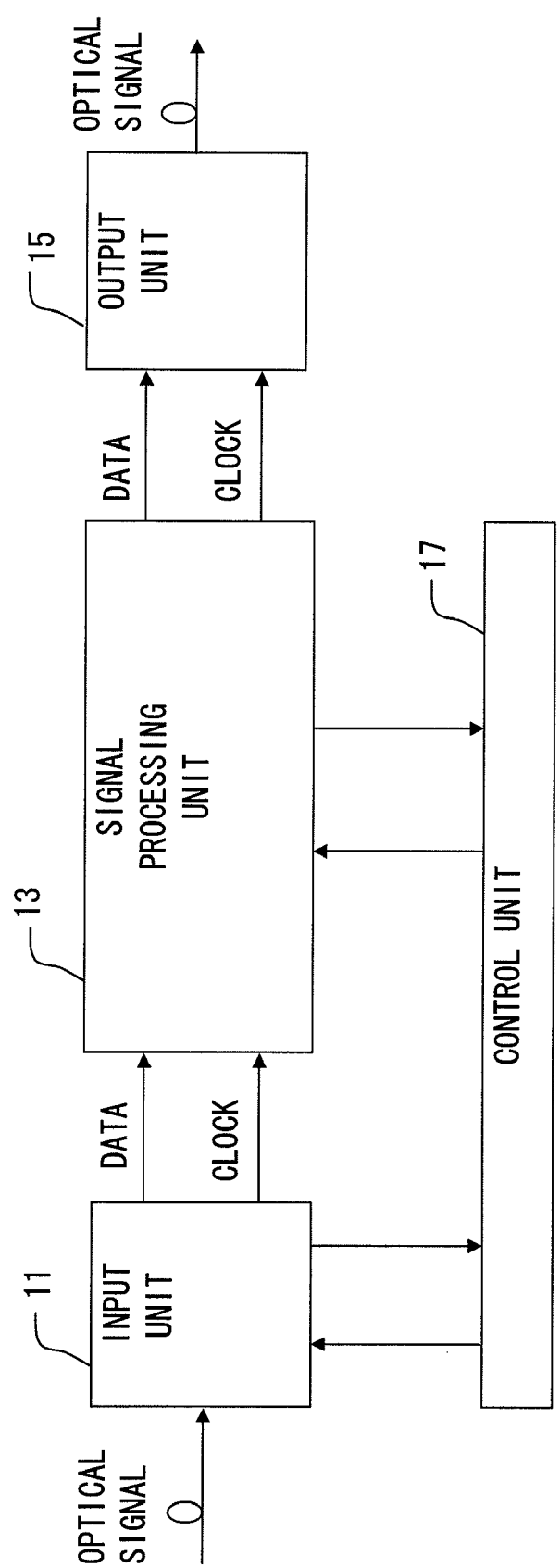
FIG. 1 is a diagram showing and outline of a functional configuration of a WDM relay device in the present embodiment.

FIG. 1 is a diagram showing an outline of a functional configuration of the WDM relay device in the embodiment of the present invention. Functions of the WDM relay device in the present embodiment will hereinafter be explained with reference to FIG. 1.

Note that the outline of the functional configuration of the WDM relay device illustrated in FIG. 1 represents a configuration in which an unillustrated optical demultiplexer demultiplexes a wavelength division multiplexing signal beam inputted to the WDM relay device into optical signals having respective wavelengths that configure the wavelength division multiplexing signal beam, and thereafter the optical signals are inputted. Further, the outline of the functional configuration of the WDM relay device illustrated in FIG. 1 is that the optical signals are multiplexed on a plural basis by an unillustrated optical multiplexer and outputted as the wavelength division multiplexing signal beam.

The WDM relay device in the present embodiment includes, as general components, an input unit 11, a signal processing unit 13, an output unit 15, a control unit 17, etc. These functional units are actualized respectively by hardware circuits. It is to be noted that especially the signal processing unit 13 and the control unit 17 may be actualized in a way that an LSI (Large Scale Integration), an EPGA (Field Programmable Gate Array) and so on load and execute a control program stored on an internal memory etc.

<Input Unit>

Figure 2:
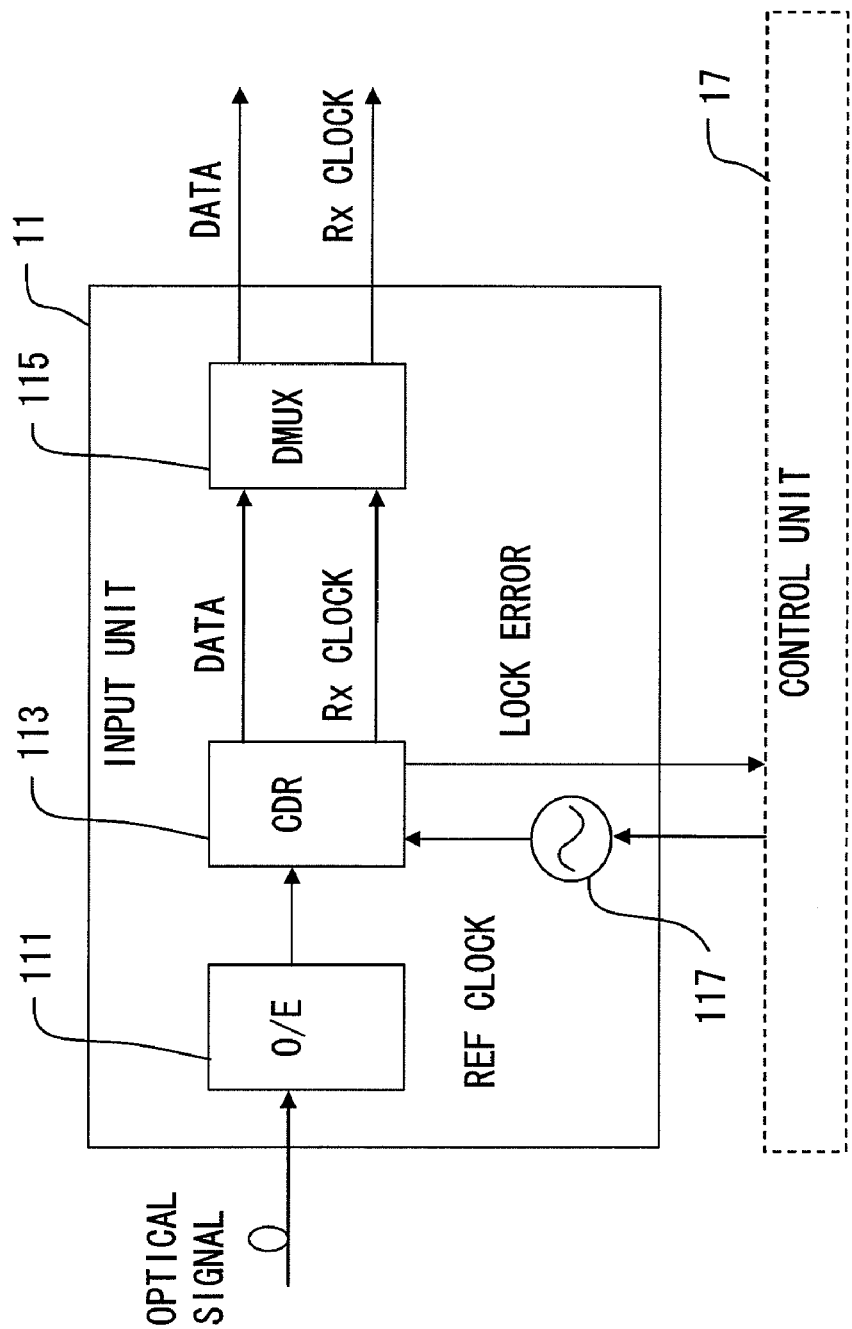
FIG. 2 is a diagram showing a functional configuration of an input unit 11.

FIG. 2 is a block diagram showing a functional configuration of the input unit 11. As shown in FIG. 2, the input unit 11 includes an optic-electric (which will hereinafter be abbreviated to O/E) converting unit 111, a clock data recovery (which will hereinafter be abbreviated to CDR) unit 113, a demultiplexer (which will hereinafter be abbreviated to DMUX) unit 115, an oscillation unit 117, etc. Through these functional units, the input unit 11 extracts a data signal and a clock signal as electric signals from the optical signals inputted via an optic-fiber etc. The input unit 11 sends the extracted data signal and clock signal to the signal processing unit 13. The functional units configuring the input unit 11 will hereinafter be described respectively.

The optical signals inputted to the input unit 11 are further inputted to the O/E converting unit 111. The O/E converting unit 111 converts the inputted optical signals into the electric signals. The thus-converted signals are sent to the CDR unit 113.

The oscillation unit 117 corresponds to an oscillation unit according to the present invention and supplies a reference clock (which will hereinafter be abbreviated to an REF clock) having a predetermined frequency to the CDR unit 113. The frequency of the REF clock, which can be supplied by the oscillation unit 117, is variable. The oscillation unit 117 switches over the frequency of the REF clock to be outputted, corresponding to a control signal given from the control unit 17. The oscillation unit 117 may be so configured as to be capable of outputting the frequency clocks that can cover all of speed sequences of OTU (Optical channel Transport Unit) defined by ITU-T G709 etc, and may also be so configured as to be capable of outputting divided-by-N (integer) frequency clocks thereof.

The CDR unit 113 corresponds to a frequency detecting unit according to the present invention, and extracts the data signal and the clock signal from main signals transmitted from the O/E converting unit 111. The extracted data signal and clock signal are each transmitted to the DMUX unit 115. The CDR unit 113 is constructed of a phase locked loop (PLL) circuit etc. The CDR unit 113 checks synchronization in frequency between the REF clock sent from the oscillation unit 117 and the main signal sent from the O/E converting unit 111 utilizing the PLL circuit. The CDR unit 113 sends an error signal (which will hereinafter be also referred to as a LOCK error) to the control unit 17 till the frequencies of the REF clock signal and the main signal get synchronized. On the other hand, the control unit 17 controls the oscillation unit 117 to change the REF clock outputted from the oscillation unit 117 till the LOCK error is canceled. The CDR unit 113, when obtaining the clock signal synchronizing in frequency with the main signal through the PLL circuit, cancels the LOCK error, and sends the clock signal and the main signal to the DMUX unit 115.

The DMUX unit 115 demultiplexes the multiplexed main signal into the respective signals. The demultiplexed main signals and clocks signals are transmitted to the signal processing unit 13.

<Control Unit>

The control unit 17 controls the input unit 11, the signal processing unit 13 and the output unit 15, respectively (which corresponds to a control unit according to the present invention). The control unit 17 monitors the LOCK error given from the CDR unit 113, and controls the input unit 11 to change the REF clock outputted from the oscillation unit 117 till the LOCK error is canceled. At this time, the control unit 17 transmits a control signal to the oscillation unit 117 so as to change the REF clock. The control unit 17, when the LOCK error is canceled, sets a frequency of the REF clock at this time in the signal processing unit 13. With this contrivance, the signal processing unit 13 comes to operate synchronizing with the thus-set clock.

Further, the control unit 17 instructs the signal processing unit 13 to change an FEC type and a payload type till getting conformed with a frame format of the signal. The control unit 17 notifies the output unit 15 of the FEC type and the payload type conforming with the frame format of the signal.

Moreover, the control unit 17 may sequentially output frames of regenerated client signals transmitted from the signal processing unit 13, to display devices etc connected to the present WDM relay device. This scheme enables the client signals flowing across the present WDM relay device to be displayed (monitored) on the display device. Still further, the control unit 17 may receive, without being limited to the client signals, an OTU frame from a DW unit 131 and may output the OTU frame to the display device.

<Signal Processing Unit>

Figure 3:
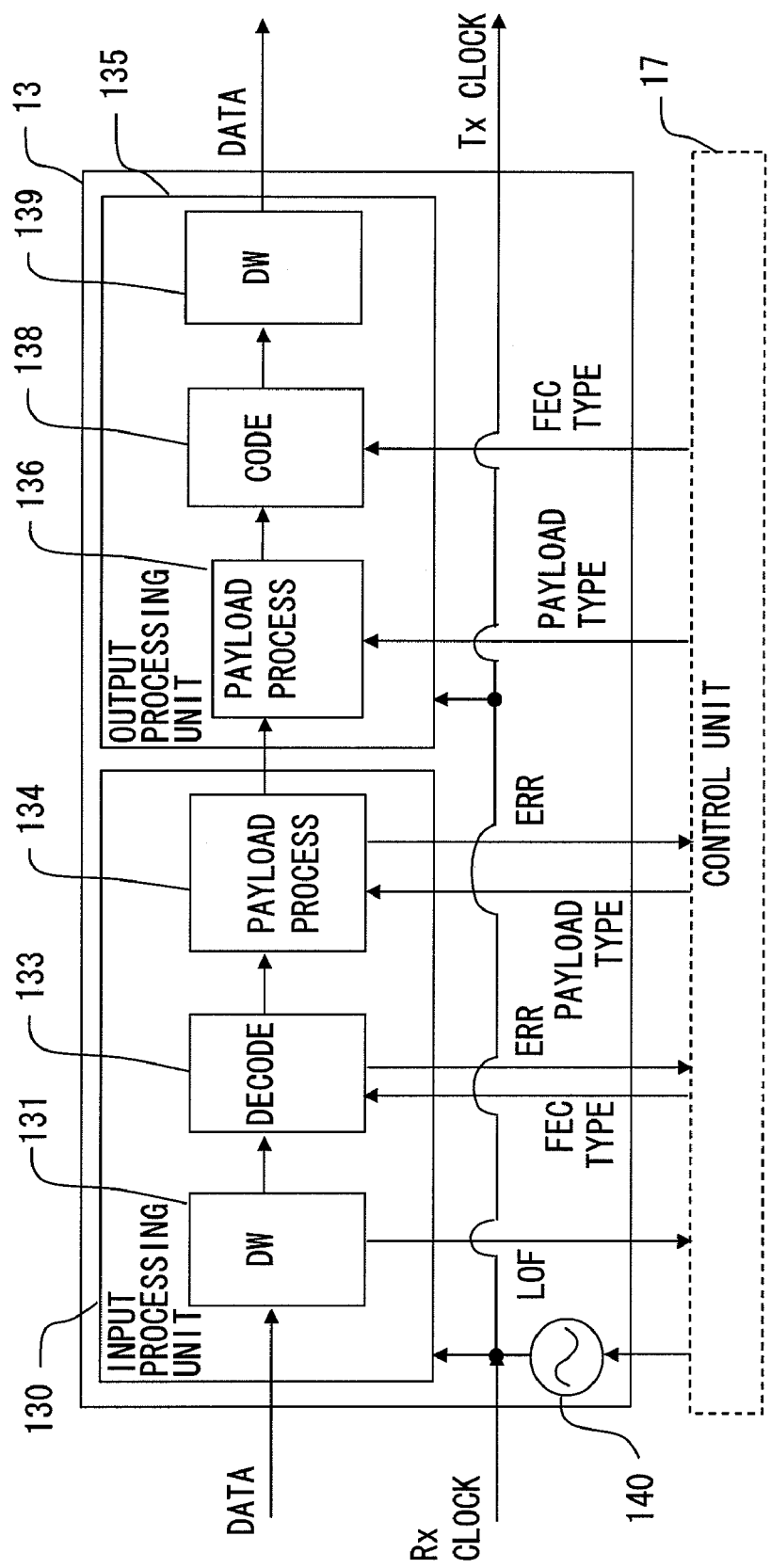
FIG. 3 is a diagram showing a functional configuration of a signal processing unit 13.

FIG. 3 is a block diagram showing a functional configuration of the signal processing unit 13. As shown in FIG. 3, the signal processing unit 13 includes an input processing unit 130, an output processing unit 135 and an oscillation unit 140 (which corresponds to a frame detecting unit according to the present invention). Through these functional units, the signal processing unit 13 regenerates-and-relays the data signals (OTN signals) inputted from the input unit 11 in a way that executes error correction using FEC (Forward Error Correction). The respective functional units configuring the signal processing unit 13 will be explained.

The oscillation unit 140 outputs the frequency clocks set by the control unit 17. The individual functional units of the signal processing unit 13 operate synchronizing with the frequency clocks outputted by the oscillation unit 140. Further, the frequency clocks outputted by the oscillation unit 140 synchronize with the clock signals transmitted from the input unit 11, and are sent together with the data signals to the output unit 15.

Figure 4:
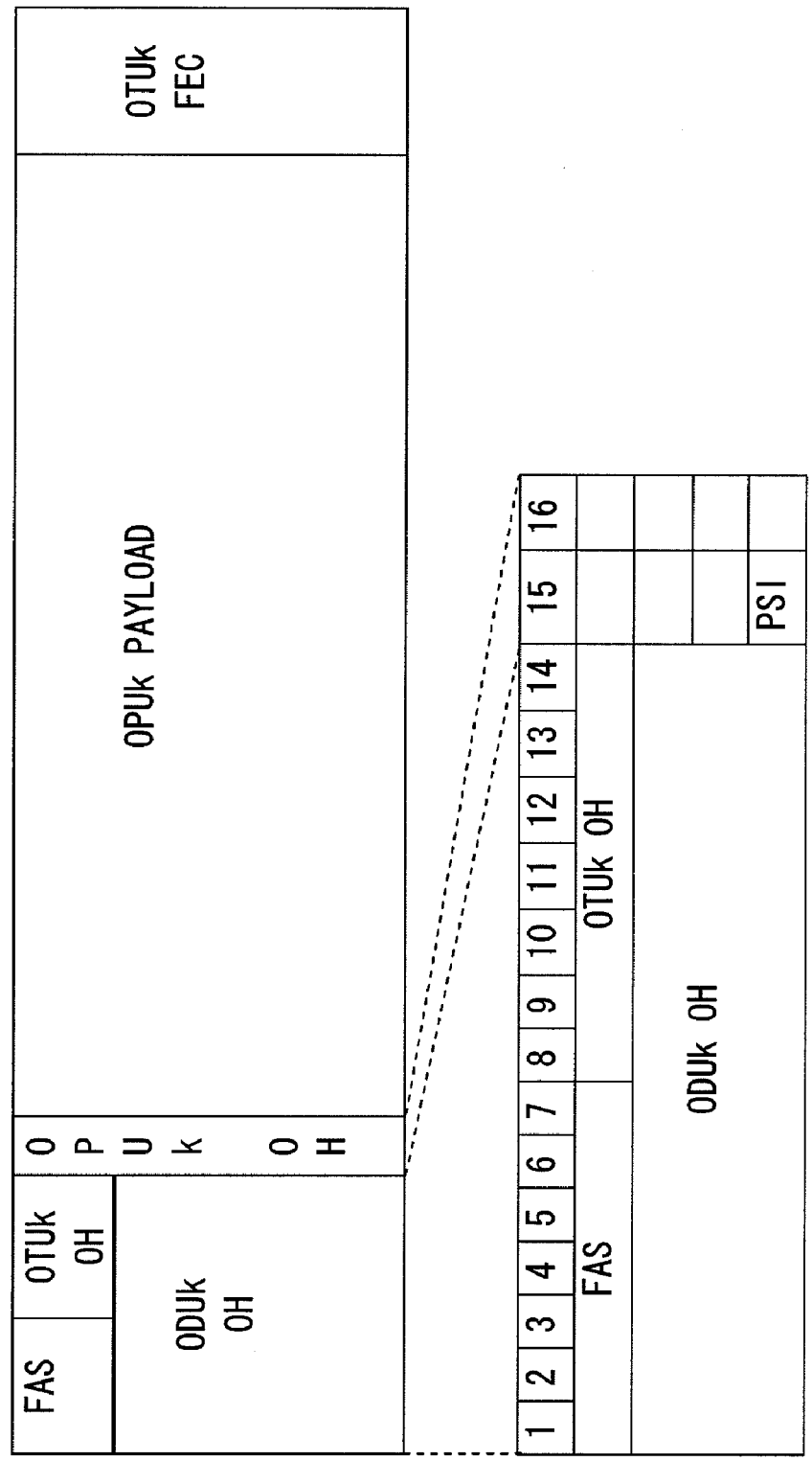
FIG. 4 is a diagram showing an OTU frame format.

The input processing unit 130 has the data wrapper (which will hereinafter be abbreviated to DW) unit 131, a decoding unit 133, a payload processing unit 134, etc. The input processing unit 130, through these functional units, regenerates the frame contained in a payload (data fields) of the data signals (OTN signals) from the same data signals transmitted via the input unit 11. This OTN signal is configured by an OTU (Optical channel Transport Unit) frame defined by the ITU-T G.709 etc. FIG. 4 is a diagram showing the OTU frame format. As illustrated in FIG. 4, the OTU frame is built up by data fields such as FAS (Frame Alignment Signal), OTUk-OH (Optical channel Transport Unit—Over Head), ODUk-OH (Optical channel Data Unit—Over Head), OPUk-OH (Optical channel Payload Unit—Over Head), OPUk-Payload and OTUk-FEC. Note that numeral values "1" through "3" are entered in "k" as standardized OTU types. The OTN signals inputted to the input processing unit 130 are signals having standardized formats as, e.g., OTU1, OTU2 and OTU3.

Note that the control unit 17 detects the type of the frame format of the inputted OTN signal by controlling the input processing unit 130, and sets the information about the detected frame format in the output processing unit 135. The functional units configuring the input processing unit 130 will hereinafter be respectively explained.

The DW unit 131 takes frame synchronization of the inputted OTN signal. The DW unit 131 takes the frame synchronization by detecting a frame synchronization pattern set in the FAS field described above. The DW unit 131 outputs LOF (Loss Of Frame) signals to the control unit 17 till the frame synchronization is taken. The DW unit 131, when the frame synchronization is taken, sends the OTU frame thereof to the decoding unit 133.

The decoding unit 133 performs the error correction (which corresponds to a correcting unit according to the present invention) based on an FEC code set in OTUk-FEC (which will hereinafter be termed an FEC field) of the OTU frame sent from the DW unit 131. The decoding unit 133, at first before executing the error correction process, detects the FEC type used in the OTU frame. ITU-T G.975 defines plural types of FEC codes usable in the OTU frame. For instance, there are a Reed-Solomon (RS) code, a BCH code (Bose-Chaudhuri-Hocqenghem) code, an LDPC (Low Density Parity Check Code), and so on.

The decoding unit 133 has respective decoding process units (corresponding to error correction processing unit according to the present invention) corresponding to these plural types of standardized coding methods, and detects the FEC type attached to the inputted OTU frame by sequentially switching over these decoding process units. Incidentally, the decoding process corresponding to each coding method is a known technology, and hence its explanation is omitted. Further, each of the decoding process units is actualized by an LSI, and the decoding unit 133 may include a plurality of should-correspond decode processing LSIs.

The decoding unit 133, when detecting non-coincidence with the FEC type of the processing target OTU frame in the decoding process by the predetermined decoding process unit, informs the control unit 17 of error notification (LOF signal). The control unit 17 receives the error notification and instructs the decoding unit 133 to switch over the decoding process units that should be made to sequentially execute the processes. Thus, the decoding unit 133 switches over the decoding process units to be operated till the error is canceled. The decoding unit 133, when detecting the FEC type of the OTU frame, notifies the control unit 17 of the detected FEC type. Further, the decoding unit 133 makes the error correction of the OTU frame by the decoding process corresponding to the detected FEC type. Items of data in the OPUk-OH field and the OPUk-Payload field of the error-corrected OTU frame are sent to the payload processing unit 134.

The payload processing unit 134 regenerates the frame of the client signal contained in the OPUk-Payload field out of the data sent from the decoding unit 133 (which corresponds to a format detecting unit and a regenerating unit according to the present invention). There is a possibility in which the frame of one of SONET/SDH, GbE, FC, FICON, SCON, etc might be set at the client signal in this OPUk-Payload field. The payload processing unit 134 detects a frame format type (which will hereinafter be referred to also as a payload type) of the unknown client signal, and regenerates the frame.

The payload processing unit 134 may also refer to the payload type (PT) set in, e.g., a PSI (Payload Structure Identifier) in the OPUk-OH field in order to detect the payload type in this OPUk-Payload field. Moreover, the payload processing unit 134 may include a plurality of framers (corresponding to format detecting unit according to the present invention) corresponding to the types of the client signals, wherein these framers may be switched over based on an instruction of the control unit 17, and the payload type may thus be detected.

The payload processing unit 134 can detect the payload type and, when capable of taking the frame synchronization of the client signal in this payload field, regenerates this frame. The thus-regenerated frame of the client signal is sent to the output processing unit 135 and to the control unit 17.

The output processing unit 135 has a payload processing unit 136, a coding unit 138 and a DW unit 139, etc (which corresponds to a transmitting unit according to the present invention). The output processing unit 135, through these functional units, transmits, as the OTN signal, the client signal sent from the input processing unit 130 to the output unit 15. Each of these functional units is notified of the FEC type and the payload type that are detected by the input processing unit 130 by the control unit 17. Each of the functional units in the output processing unit 135 will hereinafter be described.

The payload processing unit 136 sets the client signal transmitted from the input processing unit 136 in the OPUk-Payload field, and generates a frame attached further with OPUk-OH. The payload processing unit 136 executes the generating process corresponding to the payload type of which the control unit 17 notifies. The generated frame is sent to the coding unit 138.

The coding unit 138 generates a frame into which the frame, consisting of OPUk-OH and OPUk-Payload, generated by the payload processing unit 136 is further attached with OCh-OH (Optical Channel—Over Head) (configured by FAS, OTUk-OH and ODUk-OH shown in FIG. 4). The coding unit 138 codes the thus-generated frame according to the FEC type of which the control unit 17 notifies. The coding unit 138 attaches a code bit to the frame, thereby generating the OTU frame. The coding unit 138 has respective code processing units corresponding to plural types of coding methods standardized in ITU-T G.975 etc, wherein the code processing units made to execute the processes are switched over corresponding to the notification given from the control unit 17. The generated OTU frame is transmitted to the DW unit 139.

The DW unit 139 sets predetermined items of data such as the FAS field of the OTU frame, and outputs data-set OTU frame to the output unit 15.

<Output Unit>

The output unit 15 includes a multiplexer (which will hereinafter be abbreviated to MUX) unit, an electric/optic (which will hereinafter be abbreviated to E/O) converting unit, etc (unillustrated) (which corresponds to a transmitting unit according to the present invention). In the output unit 15, the OTN signals sent from the signal processing unit 13 are multiplexed by the MUX unit, then converted into optical signals by the E/O converting unit and outputted from an optical fiber etc.

[Operational Example]

Figure 5:
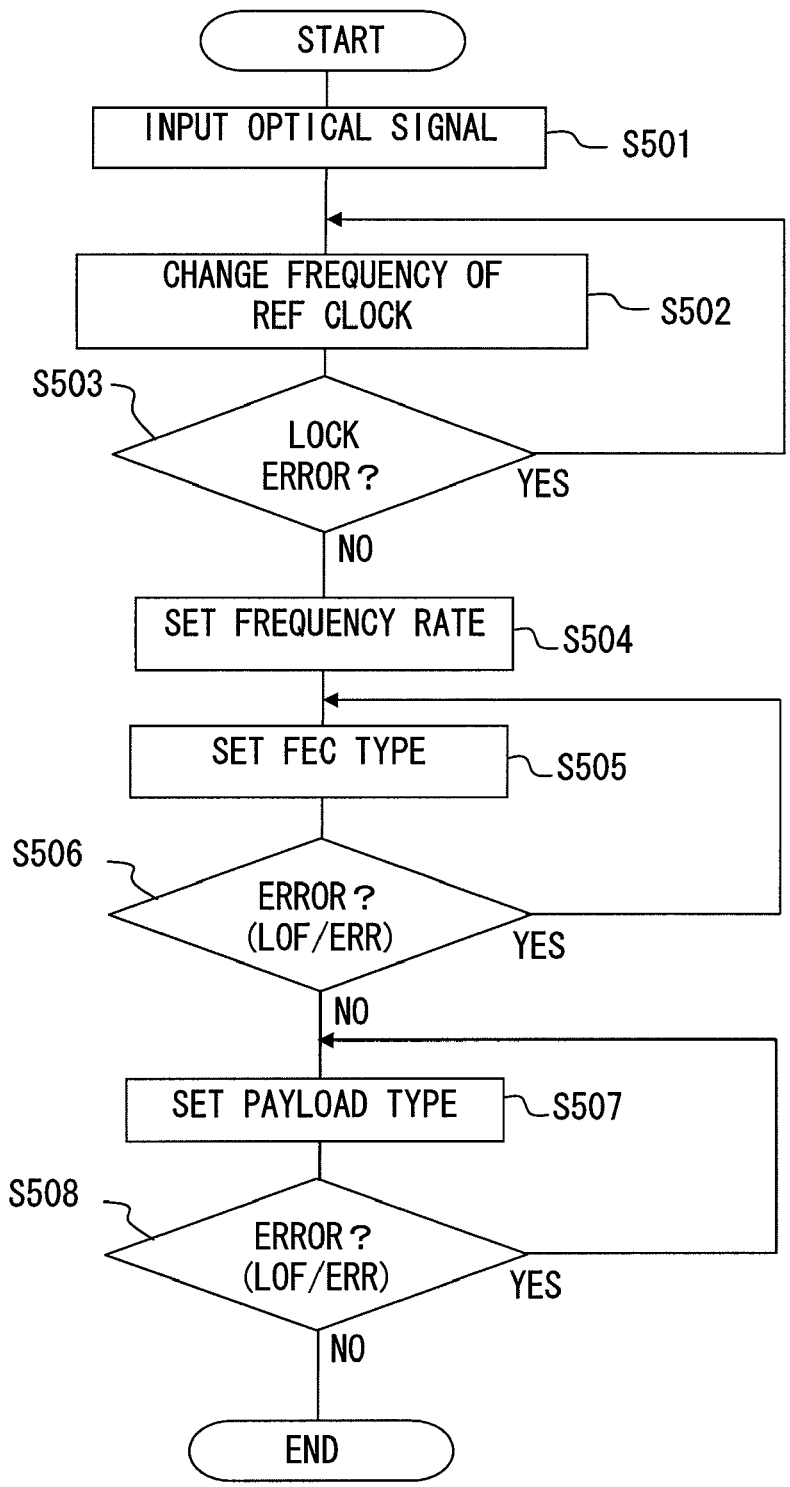
FIG. 5 is a flowchart showing an example of a client signal regenerating process in the present embodiment.

Next, an operation of the WDM relay device in the present embodiment will hereinafter be explained with reference to FIG. 5. FIG. 5 is a flowchart showing an example of a client signal regenerating process of the WDM relay device in the present embodiment, i.e., an example of operations of the input unit 11 and of the input processing unit 130 within the signal processing unit 13.

The input unit 11, when the optical signal is inputted from the optical fiber etc (S501), converts the optical signal into the electric signal (the O/E converting unit 111). The CDR unit 113 extracts the data signal and the clock signal from the converted signals. At this time, the control unit 17 conducts the control of switching over the frequency of the REF clock supplied (from the oscillation unit 117) to the CDR unit 113 (S502). The CDR unit 113 outputs the LOCK error signal to the control unit 17 till the REF clock gets synchronized with the main signal, while the control unit 17 executes the switchover of the frequency of the REF clock till the LOCK error is cancelled (S503; YES, S502). When the LOCK error is cancelled (S503; NO), the REF clock, i.e., the information of the frequency taking the synchronization with the frequency of the main signal at that time, is set in the oscillation unit of another functional unit (S504).

Next, the main signal (the OTN signal) is inputted to the input processing unit 130 within the signal processing unit 13, wherein the client signal contained in the payload field thereof is regenerated. On the occasion of this signal regeneration, the DW unit 131 takes the frame synchronization of the inputted OTN signal. Then, when taking the frame synchronization, the decoding unit 133 detects the FEC type used in this OTU frame.

At this time, the decoding unit 133 sequentially executes the respective decoding processes corresponding to the FEC types undergoing the switchover instruction by the control unit 17 (S505). The control unit 17 gives the instruction to switch over the decoding processes till the error output given from the decoding unit 133 is cancelled (S506; YES, S505). When the error output given from the decoding unit 133 is cancelled (S506; NO), i.e., when the FEC type of the OTU frame is detected, the OTN signal is error-corrected based on the detected FEC type.

Next, the payload processing unit 134 regenerates the client signal contained in the payload field from the normally-error-corrected frame. At this time, the payload processing unit 134 detects the frame format type (the payload type) of the client signal. The payload type is detected in a way that sequentially switches over the framers according to the respective frame format included in the payload processing unit 134, alternatively in a way that refers to the payload type set in PSI in the OPUk-OH field (S507, S508). The control unit 17 performs the control of switching over the framers executed in the payload processing unit 134.

The thus-detected FEC type and frame format type are used for configuring the OTU frame for relaying the regenerated client signal.

<Operation and Effect in Embodiment>

In the WDM relay device in the present embodiment, the CDR unit 113 extracts the data signal (OTN signal) and the clock signal from the electric signals into which the inputted optical signals are converted. At this time, the automatic change is carried out till the frequency of the REF clock supplied to the CDR unit 113 gets synchronized with the frequency of the data signal (till LOCKed). The thus-detected frequency of the main signal is set as the operation clock of each of the functional units executing the signal processing from this onward.

Namely, according to the WDM relay device in the present embodiment, even in the case of changing the rate of the signals to be inputted, the frequency clock synchronizing with this signal rate is automatically set. Further, only the signals having the known transmission rate and format could hitherto be flowed through (the WDM relay device), however, the scheme is that even the signals having an unknown transmission data and an unknown format can be, also when transmitted (to the WDM relay device), automatically flowed through it.

Accordingly, it is possible to reduce a labor and a period of time for initial setting to a large degree in the case of switching over the signals, and so on.

Further, in the WDM relay device in the present embodiment, after setting the rate, the FEC type and the frame format type are detected in order to regenerate the client signal rapped with the OTN signal. For attaining this, the decoding process units corresponding to the respective FEC types that are provided in the decoding unit 133 and the framers corresponding to the respective frame format types that are provided in the payload processing unit 134, are sequentially switched over till getting coincident with the signal.

Namely, according to the WDM relay device in the present embodiment, such a scheme is done that though only the signals having the known transmission rate and format could hitherto be flowed through (the WDM relay device), the signals having he unknown transmission data and the unknown format can be, also when transmitted (to the WDM relay device), automatically flowed through it.

Therefore, also at the present time when the signals increase in their types due to diversification of the communication technologies, the time and the labor expended for the initial setting of the relay device can be reduced to the large degree.

Moreover, in the WDM relay device in the present embodiment, the frames of the regenerated client signals can be sequentially outputted to the display device etc connected to the WDM relay device.

With this configuration, the client signals flowing through the WDM relay device can be displayed (monitored) on the display device. Further, the control unit 17 can also receive and output, without being limited to the client signals, the OTU frames to the display device.

<Others>

The disclosures of Japanese patent application No. JP2006-210512, filed on Aug. 2, 2006 including the specification, drawings and abstract are incorporated herein by reference.

What is claimed is:

1. A signal processing device comprising:
   a frequency detection circuit to detect a frequency of a data signal by checking synchronization between the data signal and a reference signal;
   an oscillator to supply the reference signal to said frequency detection circuit;
   a frame detection circuit to detect a frame organizing the data signal and including error correction circuits corresponding to a plurality of types of forward error correction codes different from each other; and
   a control circuit to change a frequency of the reference signal supplied by said oscillator in order to take frequency synchronization between the data signal and the reference signal in checking the synchronization by said frequency detection circuit, to set information of the frequency, of which the frequency synchronization has been taken, in said frame detection circuit, to detect a type of the forward error correction code attached to the frame detected by said frame detection circuit, and to make one of said error correction circuits perform error correction of the detected frame, the one of said error correction circuits corresponding to the detected type of the forward error correction code attached to the frame.

2. The signal processing device according to claim 1, wherein said frame detection circuit includes a format detection circuits each detecting a frame format of a client signal that is set in a payload field of the frame organizing the data signal, corresponding to the respective frame format types, and
   said control circuit controls said frame detection circuit so as to implement said format detection circuit corresponding to the frame format type of the client signal, which is set in the payload field of the frame organizing the data signal.

3. A relay device comprising:
   a frequency detection circuit to detect a frequency of a data signal by checking synchronization between a reference signal and the inputted data signal;
   an oscillator to supply the reference signal to said frequency detection circuit;
   a frame detection circuit to detect a frame organizing the data signal;
   a correction circuit to include error correction circuits corresponding to a plurality of types of forward error correction codes different from each other and to detect a type of the forward error correction code attached to the detected frame by sequentially switching over said error correction circuits in order to perform error correction of the frame detected by said frame detection circuit;
   a regenerator to regenerate the data signal by executing a coding process corresponding to the type of the error correction code detected by said correction circuit with respect to the frame that is error-corrected by said correction circuit;
   a transmitter to transmit the regenerated data signal; and a control circuit to change a frequency of the reference signal supplied by said oscillator in order to take frequency synchronization between the data signal and the reference signal in checking the synchronization by said frequency detection circuit, to set information of the frequency, of which the frequency synchronization has been taken, in said frame detection circuit, said correction circuit, said regenerator and said transmitter, and to make one of said error correction circuits perform error correction of the detected frame, the one of said error correction circuits corresponding to the type of the forward error correction code attached to the detected frame.

4. A signal processing method executed by a signal processing device including a frequency detecting unit detecting a frequency of a data signal by checking synchronization between the data signal and a reference signal, an oscillation unit supplying the reference signal to said frequency detecting unit, and a frame detecting unit detecting a frame organizing the data signal and including error correction processing units corresponding to a plurality of types of forward error correction codes different from each other, the signal processing method comprising:

changing a frequency of the reference signal supplied by said oscillation unit to take frequency synchronization between the data signal and the reference signal in checking the synchronization by said frequency detecting unit;

setting information of the frequency, of which the frequency synchronization has been taken, in said frame detecting unit; and detecting a type of the forward error correction code attached to the frame detected by said frame detecting unit, making one of said error correction processing units perform error correction of the frame detected by said frame detecting unit, the one of said error correction processing units corresponding to the detected type of the forward error correction code attached to the detected frame.

* * * * *

UNITED STATES PATENT AND TRADEMARK OFFICE
CERTIFICATE OF CORRECTION

| | |
|---|---|
| PATENT NO. | : 8,102,945 B2 |
| APPLICATION NO. | : 11/776036 |
| DATED | : January 24, 2012 |
| INVENTOR(S) | : Tsutomu Tsurumi et al. |

It is certified that error appears in the above-identified patent and that said Letters Patent is hereby corrected as shown below:

Column 10, line 37: "detection circuit includes a format" should be changed to --detection circuit includes format--

Signed and Sealed this
Second Day of October, 2012

David J. Kappos
*Director of the United States Patent and Trademark Office*